United States Patent
Uehara et al.

(10) Patent No.: US 10,948,024 B1
(45) Date of Patent: Mar. 16, 2021

(54) CLUTCH DISC AND TORQUE LIMITER

(71) Applicant: EXEDY Corporation, Neyagawa (JP)

(72) Inventors: Hiroshi Uehara, Neyagawa (JP);
Yoshiyuki Hagihara, Neyagawa (JP);
Masahiro Maeda, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 16/903,707

(22) Filed: Jun. 17, 2020

(30) Foreign Application Priority Data

Nov. 13, 2019 (JP) .............................. JP2019-205392

(51) Int. Cl.
  *F16D 7/02*   (2006.01)
  *F16D 13/64*  (2006.01)
  *F16F 15/129* (2006.01)
  *F16D 13/70*  (2006.01)

(52) U.S. Cl.
  CPC ............. *F16D 7/025* (2013.01); *F16D 13/64* (2013.01); *F16F 15/1297* (2013.01); *F16D 2013/703* (2013.01); *F16D 2300/00* (2013.01)

(58) Field of Classification Search
  CPC .......... F16D 13/64; F16D 13/68; F16D 13/71; F16D 13/72; F16D 13/74; F16D 7/02; F16D 7/24; F16D 7/025; F16D 2069/004; F16D 2069/009; F16D 25/064; F16D 2300/00; F16D 2300/10; F16D 2013/703
  See application file for complete search history.

(56) References Cited

U.S. PATENT DOCUMENTS

| 2,253,316 | A | * | 8/1941 | Armitage | F16D 13/64 192/107 R |
| 4,139,085 | A | * | 2/1979 | Kanbe | F16D 13/64 192/107 R |
| 4,747,476 | A | * | 5/1988 | East | F16D 69/0408 192/107 M |
| 5,176,236 | A | * | 1/1993 | Ghidorzi | F16D 13/648 192/107 R |

(Continued)

FOREIGN PATENT DOCUMENTS

JP          08-114239 A     5/1996

*Primary Examiner* — Charles A Fox
*Assistant Examiner* — Farhana Pervin
(74) *Attorney, Agent, or Firm* — United IP Counselors, LLC

(57) ABSTRACT

A clutch disc includes a core plate and a friction member having an annular shape. The core plate includes a coupling portion having an annular shape and a plurality of fixation portions. The plurality of fixation portions protrude radially outward from the coupling portion and are circumferentially aligned through a plurality of slits each radially extending between adjacent two of the plurality of fixation portions. The friction member is fixed to the plurality of fixation portions and has an inner diameter larger than a diameter of the core plate at inner peripheral ends of the plurality of slits. The friction member includes a plurality of discharge grooves on an inner peripheral end surface thereof in corresponding portions thereof to the plurality of fixation portions. The plurality of discharge grooves lead water to the plurality of slits when the water drops on the inner peripheral end surface of the friction member.

8 Claims, 7 Drawing Sheets

(56) References Cited

U.S. PATENT DOCUMENTS

| | | | | |
|---|---|---|---|---|
| 6,116,395 | A * | 9/2000 | Ohkubo | F16D 13/64 |
| | | | | 192/107 C |
| 8,272,966 | B2 * | 9/2012 | Saeki | F16F 15/1297 |
| | | | | 464/46 |
| 9,151,334 | B2 * | 10/2015 | Hagihara | F16D 25/0638 |
| 2007/0191118 | A1 * | 8/2007 | Saeki | F16D 7/025 |
| | | | | 464/46 |
| 2012/0142437 | A1 * | 6/2012 | Doman | F16D 43/215 |
| | | | | 464/46 |

\* cited by examiner

CLUTCH DISC AND TORQUE LIMITER

CROSS-REFERENCE TO RELATED APPLICATION

This application claims priority to Japanese Patent Application No. 2019-205392, filed on Nov. 13, 2019. The contents of that application are incorporated by reference herein in their entirety.

TECHNICAL FIELD

The present invention relates to a clutch disc and a torque limiter using the same.

BACKGROUND ART

A clutch disc assembly is installed in a clutch device for a vehicle. The clutch disc assembly is disposed between a flywheel disposed on an engine side and an input shaft extending from a transmission. Besides, the clutch disc assembly is also used in a torque limiter for preventing transmission of an excessive torque. The clutch disc assembly mainly includes a damper unit including a plurality of torsion springs and a clutch disc fixed to the outer peripheral part of the damper unit.

As described in Japan Laid-open Patent Application Publication No. H08-114239, the clutch disc includes a cushioning plate and a pair of friction members each having an annular shape. The cushioning plate includes an annular portion and a plurality of cushioning portions provided on the outer peripheral part of the annular portion. The annular portion is fixed at the inner peripheral part thereof to an input plate of the damper unit by rivets. The pair of friction members is fixed to the both lateral surfaces (faces) of the plurality of cushioning portions.

In the clutch disc, steps are formed between the cushioning plate and the inner peripheral end surfaces of the pair of friction members. Because of this, when a vehicle, in which the clutch disc assembly is installed, is not used for a long period of time, chances are that water accumulates on the inner peripheral end surfaces of the pair of friction members.

In more detail, when the vehicle is immersed in water or when condensation occurs inside the vehicle due to external environment, chances are that water inevitably accumulates in a space enclosed by part of the inner peripheral end surfaces of the pair of friction members, which is located in a low position in stop of the vehicle, the lateral surfaces (faces) of the cushioning plate, and friction surfaces of members with which the pair of friction members is pressed in contact.

Especially in the torque limiter, the water accumulating in the space described above is unlikely to drain. This is because the pair of friction members of the clutch disc infrequently separates from the friction surfaces of the opponent members thereof, and the cushioning plate has a flat shape.

As described above, when water accumulates on the inner peripheral end surfaces of the pair of friction members in the clutch disc, the water soaks into the surfaces of the pair of friction members whereby the pair of friction members becomes unstable in characteristics.

BRIEF SUMMARY

It is an object of the present invention to stabilize frictional characteristics of a friction member of a clutch disc by making it difficult for water to accumulate on the inner peripheral end surface of the friction member.

(1) A clutch disc according to the present invention includes a core plate and a friction member having an annular shape. The core plate includes a coupling portion having an annular shape and a plurality of fixation portions. The plurality of fixation portions are provided to protrude radially outward from the coupling portion. The plurality of fixation portions are disposed in circumferential alignment through a plurality of slits each provided to radially extend between adjacent two of the plurality of fixation portions. The friction member is fixed to the plurality of fixation portions of the core plate. The friction member has an inner diameter larger than a diameter of the core plate at radially inner ends of the plurality of slits.

Besides, the friction member is provided with a plurality of discharge grooves on an inner peripheral end surface thereof in corresponding portions thereof to the plurality of fixation portions. The plurality of discharge grooves lead water to the plurality of slits when the water drops on the inner peripheral end surface of the friction member.

In stop of a vehicle or so forth, water, produced in the surroundings of the clutch disc, drops on the inner peripheral end surface (i.e., the upper surface) of a part located in a low position in the friction member. The friction member is herein provided with the discharge grooves on the inner peripheral end surface thereof. Hence, the water, dropping on the inner peripheral end surface of the friction member, is led to the slits through the discharge grooves. The water, led to the slits, is discharged below the friction member through the slits.

Here, it is made difficult for water to accumulate on the inner peripheral end surface of the friction member. Because of this, water is inhibited from soaking into the surface of the friction member, whereby frictional characteristics of the friction member can be stabilized.

(2) Preferably, the plurality of discharge grooves are provided on a side closer to the core plate on the inner peripheral end surface of the friction member. Besides, the plurality of discharge grooves slant in the corresponding portions to the plurality of fixation portions in the friction member such that the water flows from a circumferential middle of each of the corresponding portions to slits provided on both circumferential sides of the each of the corresponding portions among the plurality of slits.

(3) Preferably, the plurality of discharge grooves are each shaped to increase in depth with separation from the circumferential middle to the both circumferential sides.

(4) Preferably, the plurality of slits of the core plate are opened on an outer peripheral side.

(5) Preferably, the core plate has a larger diameter at radially outer ends of the plurality of slits than an outer diameter of the friction member.

(6) Preferably, the friction member has a flat face not provided with a radially extending groove on a friction surface thereof.

Now, there is a type of friction member provided with a radially extending groove or grooves on the face or faces thereof in order to discharge foreign objects such as frictional powder. When provided with the groove or grooves described above, the friction member is capable of discharging water accumulating on the inner peripheral end surface thereof through the groove or grooves.

However, it is preferred for the friction member not to be provided with any radially extending groove when there are demands of, for instance, producing the friction member as thinly as possible or uniformly setting the pressure per area unit on the friction surface. Also, the friction member, when not provided with any radially extending groove, has the drawback to be solved as described above.

Thus, the present invention is more effective when applied to the friction member not provided with any radially extending groove.

(7) Preferably, the plurality of slits of the core plate are each shaped to gradually increase in width to the outer peripheral side. In this case, the slits are gradually widened to the outer peripheral side. Hence, water is easily discharged therethrough.

(8) A torque limiter according to the present invention includes an input rotary member including a friction surface, a pressure plate, a pressing member, the clutch disc configured as any of the above and an output rotary member. The pressure plate is disposed in opposition to the friction surface of the input rotary member. The pressing member presses the pressure plate toward the input rotary member. The clutch disc is interposed and held between the friction surface of the input rotary member and the pressure plate by the pressing member. The output rotary member is provided with the clutch disc attached to an outer peripheral part thereof.

Overall, according to the present invention described above, it is made difficult for water to accumulate on the inner peripheral end surface of a friction member of a clutch disc, whereby frictional characteristics of the friction member can be stabilized.

DETAILED DESCRIPTION

Entire Configuration

Figure 1:
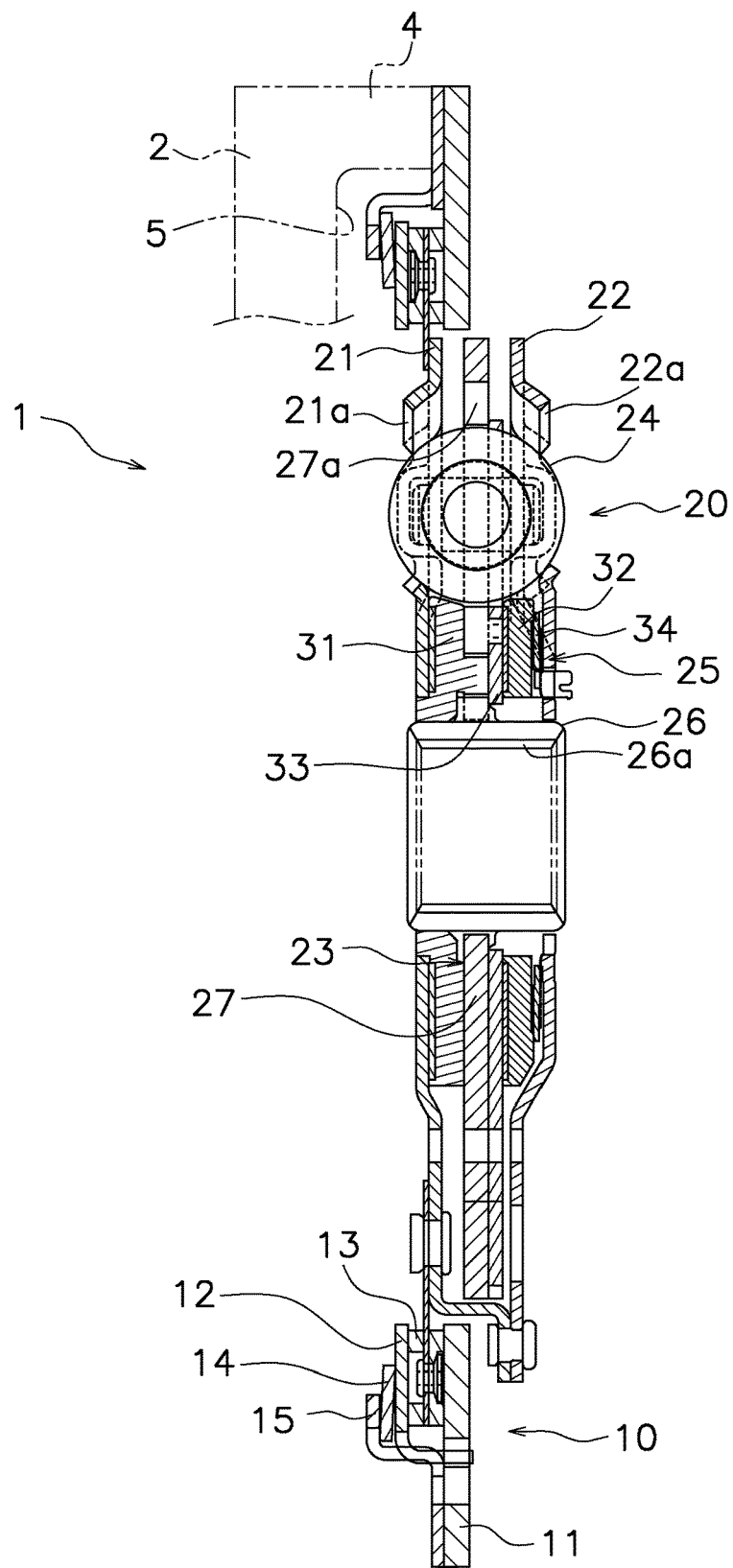
FIG. 1 is a cross-sectional view of a torque limiter according to a preferred embodiment of the present invention.
Figure 2:
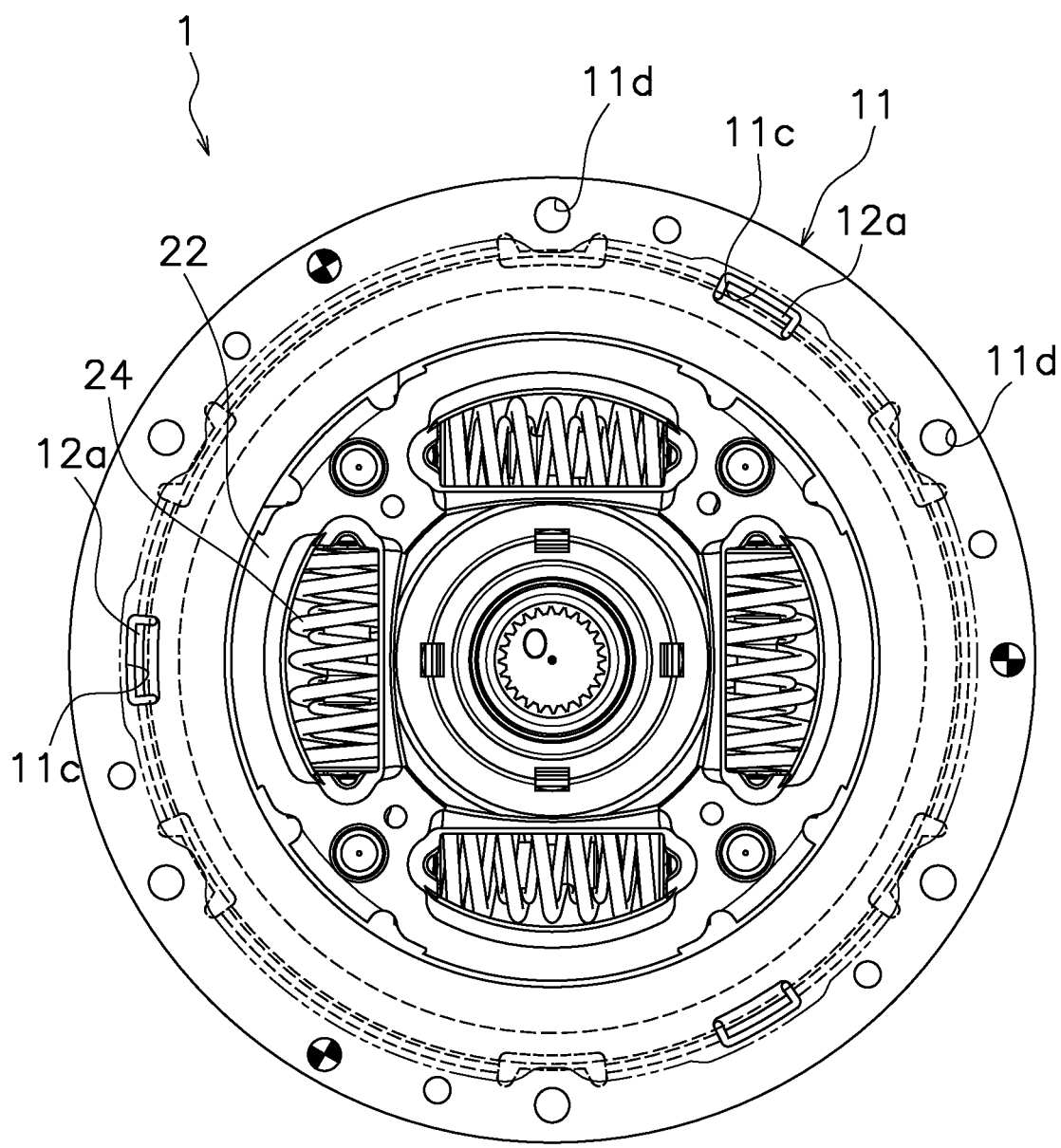
FIG. 2 is a front view of the torque limiter shown in FIG. 1.

FIG. 1 is a cross-sectional view of a torque limiter 1 including a clutch disc according to a preferred embodiment of the present invention. The present torque limiter 1 is attached to a flywheel 2 in order to limit a torque transmitted between an engine and a drive unit, and simultaneously, attenuate rotational fluctuations. On the other hand, FIG. 2 is a front view of the torque limiter 1.

It should be noted that the flywheel 2 is fixed to an engine-side member (not shown in the drawings). The flywheel 2 is a disc-shaped member and includes an annular portion 4 and an accommodation portion 5. The annular portion 4 is provided in the outermost peripheral part of the flywheel 2. The accommodation portion 5 is provided radially inside the annular portion 4. The accommodation portion 5 has a predetermined depth from an attachment surface of the annular portion 4 to the engine side.

The torque limiter 1 includes a friction coupling unit 10 and a damper unit 20.

The friction coupling unit 10 limits a torque transmitted between the flywheel 2 and the damper unit 20.

[Friction Coupling Unit 10]

Figure 3:
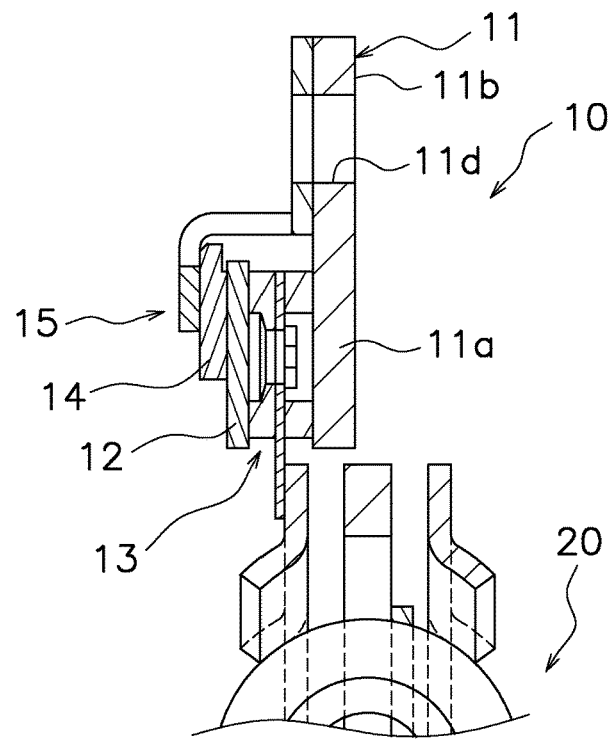
FIG. 3 is a close-up view of part of FIG. 1.
Figure 4:
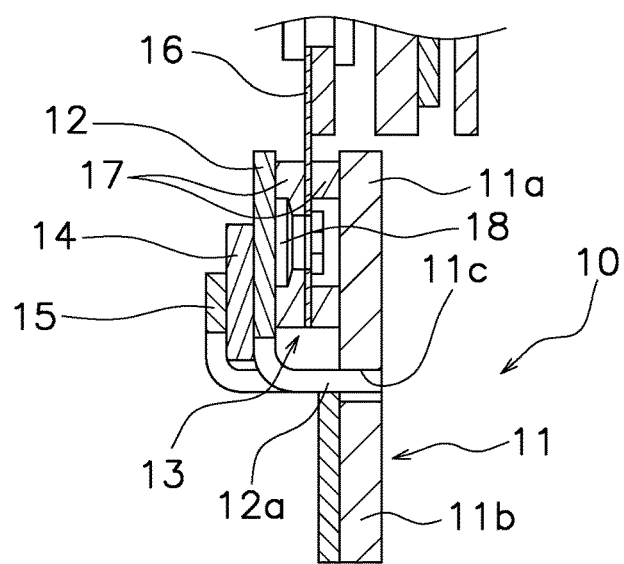
FIG. 4 is a close-up view of part of FIG. 1.

As shown close-up in FIGS. 3 and 4, the friction coupling unit 10 includes a damper cover 11 (exemplary input rotary member), a pressure ring 12, a clutch disc 13, a cone spring 14 (exemplary pressing member) and a damper ring 15.

<Damper Cover 11>

The damper cover 11 is an annular plate and includes a friction portion 11a, a fixation portion 11b and a plurality of engaging through holes 11c. The friction portion 11a is provided in the inner peripheral part of the damper cover 11, whereas the fixation portion 11b is provided on the outer periphery of the friction portion 11a. The fixation portion 11b is provided with a plurality of fixation through holes 11d. The damper cover 11 is fixed to the surface of the annular portion 4 of the flywheel 2 by a plurality of bolts penetrating the fixation through holes 11d, respectively.

The plural engaging through holes 11c, axially penetrating the damper cover 11, are provided radially between the friction portion 11a and the fixation portion 11b. The plural engaging through holes 11c, each of which is elongated in the circumferential direction, are disposed at predetermined intervals in the circumferential direction.

<Pressure Ring 12>

The pressure ring 12 is an annular plate disposed in axial opposition to the friction portion 11a of the damper cover 11 at a predetermined interval. The pressure ring 12 includes a plurality of pawls 12a. The plural pawls 12a are provided on the outer peripheral end of the pressure ring 12 and are engaged with the engaging through holes 11c of the damper cover 11, respectively. Therefore, the damper cover 11 and the pressure ring 12 are non-rotatable relative to each other.

<Clutch Disc 13>

Figure 5:
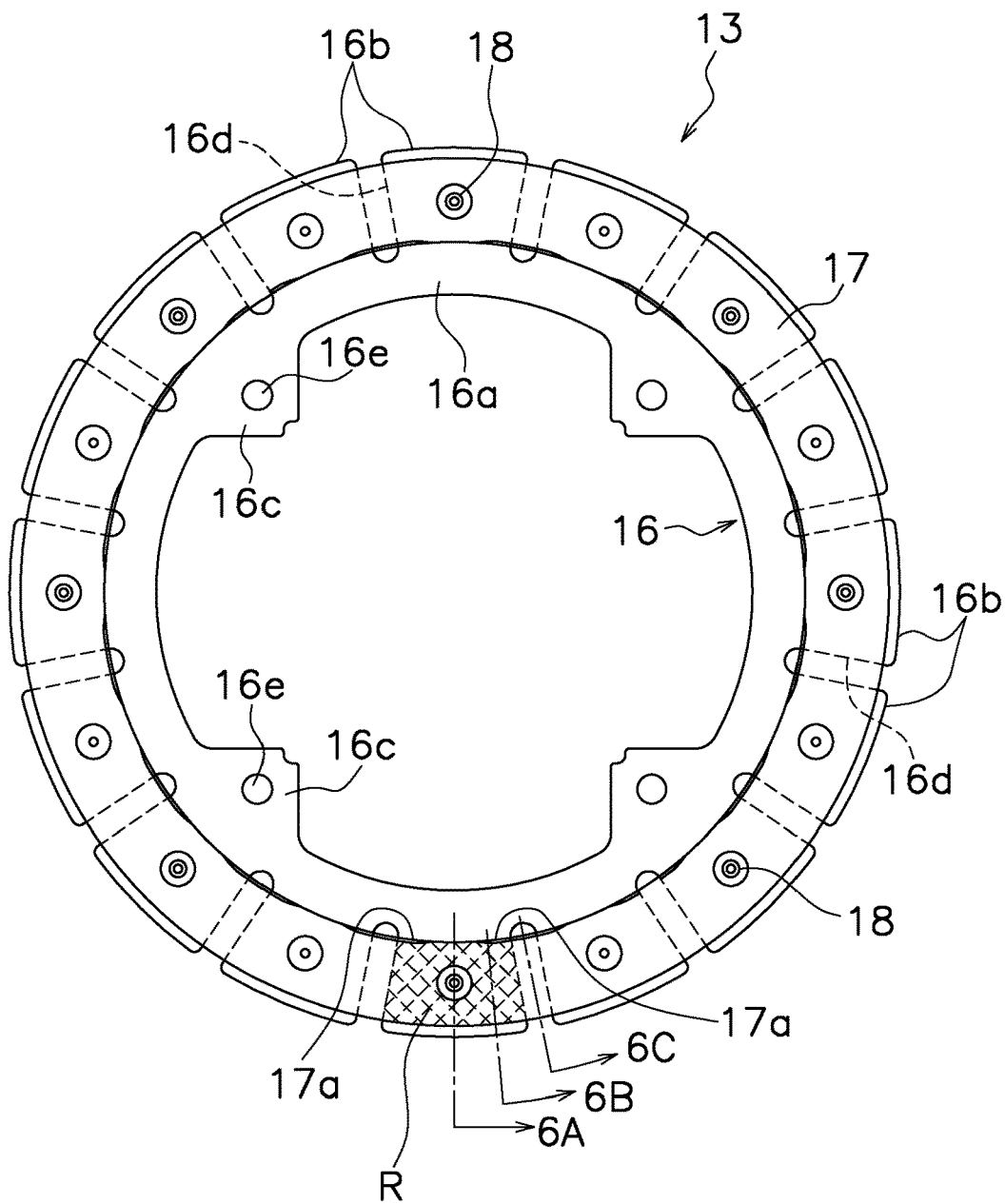
FIG. 5 is a front view of a clutch disc.

The clutch disc 13 is disposed between the friction portion 11a of the damper cover 11 and the pressure ring 12. As shown in FIG. 5, the clutch disc 13 includes a core plate 16 and a pair of friction members 17 fixed to the both lateral surfaces (faces) of the core plate 16 by a plurality of rivets 18. Here, one of the friction members 17 makes contact with the friction portion 11a of the damper cover 11, whereas the other makes contact with the pressure ring 12.

The shape of the core plate 16 is flat, not wavelike. The core plate 16 includes a coupling portion 16a having an annular shape, a plurality of fixation portions 16b and a plurality of attachment portions 16c. The plural fixation portions 16b are shaped to protrude radially outward from the coupling portion 16a and are disposed in circumferential alignment. Besides, the core plate 16 includes a plurality of slits 16d radially extending, and each slit 16d is provided circumferentially between adjacent two of the fixation portions 16b. Each slit 16d is opened radially outward. The plural attachment portions 16c, each of which is provided with an attachment through hole 16e, are provided to protrude radially inward from the coupling portion 16a.

The pair of friction members 17, each having an annular shape, is fixed to the plural fixation portions 16b of the core plate 16 by the rivers 18. The inner diameter of each friction member 17 is larger than the diameter of the core plate 16 at the base end (i.e., the radially inner end) of each slit 16d. On the other hand, the outer diameter of each friction member 17 is smaller than that of the core plate 16. In other words, the outer diameter of each friction member 17 is smaller than the diameter of the core plate 16 at the opened end (i.e., the radially outer end) of each slit 16*d*. Besides, the faces of each friction member 17 are flat without being provided with any groove.

Figure 6:
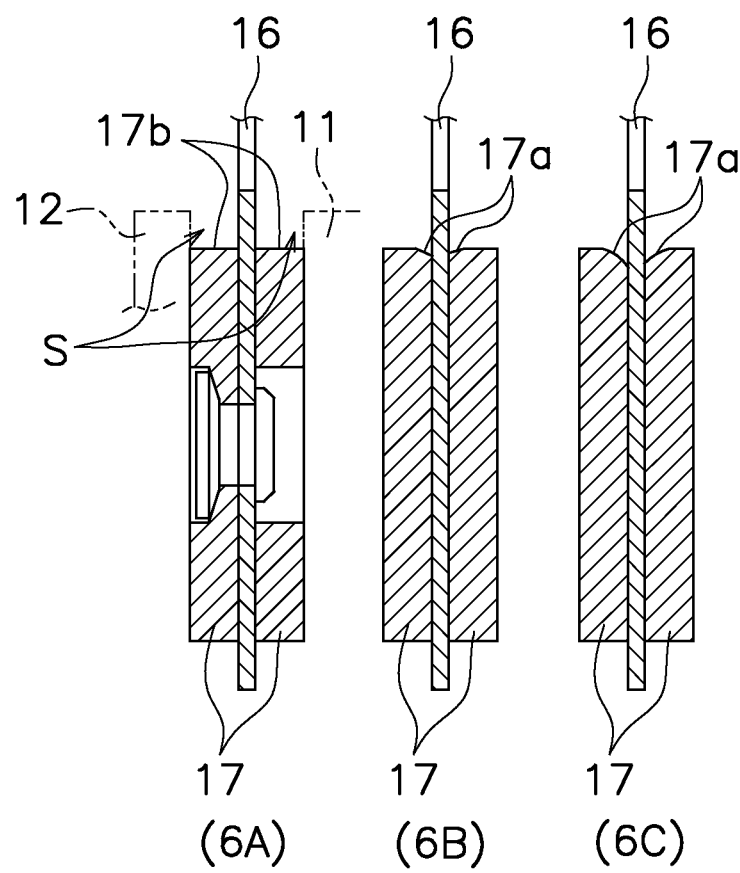
FIG. 6 shows cross sections A, B and C of the clutch disc shown in FIG. 5.

FIG. 6 shows cross sections 6A, 6B and 6C of the clutch disc 13 shown in FIG. 5. As is obvious from FIGS. 5 and 6, each friction member 17 is provided with discharge grooves 17*a* in corresponding portions to the fixation portions 16*b* of the core plate 16. The discharge grooves 17*a* will be hereinafter explained in detail.

First, "corresponding portions to the fixation portions 16*b* of the core plate 16 (in each friction member 17)" refers to regions R (only one of which is shown in FIG. 5). Put differently, the term refers to portions of each friction member 17 that overlap with the fixation portions 16*b* of the core plate 16, respectively, in a front view.

The discharge grooves 17*a* are herein provided on a core plate 16-side (a side closer to the core plate 16) on the inner peripheral end surfaces of the regions R. Specifically, the discharge grooves 17*a* in each region R extend to abut the slits 16*d* adjacent to each region R. Besides, the discharge grooves 17*a* are provided not only in the regions R but also in overlapping portions with the slits 16*d*. Hence, adjacent grooved portions in adjacent regions R continue as a single discharge groove 17*a* through the grooved portion provided in the overlapping portion with each slit 16*d* between the adjacent regions R.

Each discharge groove 17*a* is shallowest in depth, or is not provided at all, in the circumferential middle of each region R (cross section 6A). Besides, each discharge groove 17*a* gradually increases in depth with circumferential separation from the circumferential middle of each region R. In other words, each discharge groove 17*a* is shaped deeper in a site shown with the cross section 6C than in a site shown with the cross section 6B.

Figure 7:
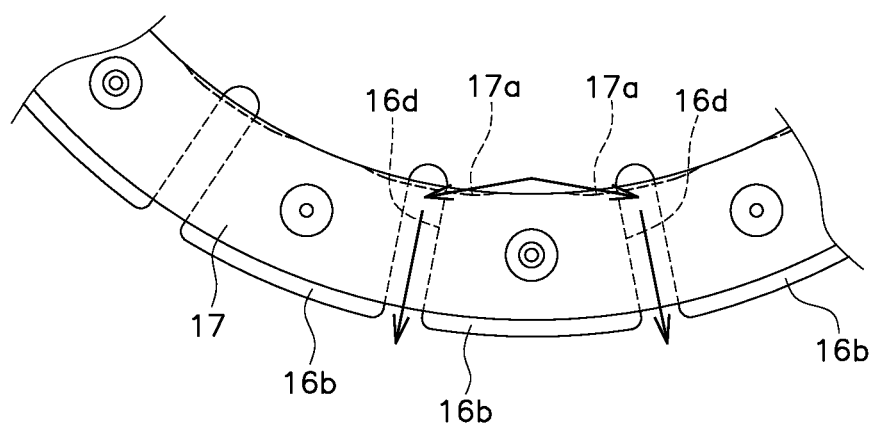
FIG. 7 is a diagram showing an action of a discharge groove.

Because of the discharge grooves 17*a* provided as described above, especially in a part located in the lowest position in stop of a vehicle, as depicted with arrows in FIG. 7, water residing on the inner peripheral end surface of each friction member 17 is led to the slits 16*d* through the discharge grooves 17*a* and is then discharged below each friction member 17.

<Cone Spring 14>

The cone spring 14 is disposed between the pressure ring 12 and the damper ring 15. The cone spring 14 presses the clutch disc 13 through the pressure ring 12 onto the friction portion 11*a* of the damper cover 11.

The damper ring 15 is disposed closer to the engine than the pressure ring 12. The damper ring 15 supports the cone spring 14 together with the pressure ring 12 therebetween, while the cone spring 14 is set in a compressed state.

[Damper Unit 20]

As shown in FIG. 1, the damper unit 20 includes a pair of a clutch plate 21 (exemplary output rotary member) and a retaining plate 22, a hub flange 23, a plurality of torsion springs 24 and a hysteresis generating mechanism 25.

<Clutch Plate 21 and Retaining Plate 22>

The clutch disc 13, composing part of the friction coupling unit 10, is coupled to the outer peripheral part of the clutch plate 21. The clutch plate 21, having a disc shape, is provided with a plurality of window portions 21*a*. The retaining plate 22 is disposed in axial opposition to the clutch plate 21 at an interval. The retaining plate 22, having a disc shape, is provided with a plurality of window portions 22*a*. The clutch plate 21 and the retaining plate 22 are fixed to each other by rivets, while being immovable relative to each other in both axial and rotational directions.

<Hub Flange 23>

The hub flange 23 includes a hub 26 and a flange 27. The hub 26, having a tubular shape, is provided in the center part of the hub flange 23. The flange 27 extends radially outward from the outer peripheral surface of the hub 26. The hub 26 is provided with a spline hole 26*a* on the inner peripheral surface thereof, whereby an input shaft of the drive unit is capable of being spline-coupled to the spline hole 26*a*. The flange 27, having a disc shape, is disposed axially between the clutch plate 21 and the retaining plate 22. The flange 27 is provided with a plurality of accommodation portions 27*a*. The accommodation portions 27*a* are provided in corresponding positions to pairs of the window portions 21*a* and 22*a* of the clutch plate 21 and the retaining plate 22, respectively.

<Torsion Springs 24>

The plural torsion springs 24 are accommodated in the accommodation portions 27*a* of the flange 27, respectively, while being held in both axial and radial directions by the pairs of the window portions 21*a* and 22*a* of the clutch plate 21 and the retaining plate 22, respectively. Besides, both circumferential end surfaces of each torsion spring 24 are capable of making contact with circumferential end surfaces of each accommodation portion 27*a* and each pair of window portions 21*a* and 22*a*.

<Hysteresis Generating Mechanism 25>

As shown in FIG. 1, the hysteresis generating mechanism 25 includes a first bushing 31, a second bushing 32, a friction plate 33 and a cone spring 34. When the hub flange 23 and both the clutch plate 21 and the retaining plate 22 are rotated relative to each other, the hysteresis generating mechanism 25 generates friction resistance (hysteresis torque) between the first bushing 31 and the clutch plate 21 and between the second bushing 32 and the friction plate 33.

[Action]

Power, transmitted from the engine to the flywheel 2, is inputted to the damper unit 20 through the friction coupling unit 10. In the damper unit 20, the power is inputted to both the clutch plate 21, to which the friction disc 13 of the friction coupling unit 10 is fixed, and the retaining plate 22 and is then transmitted to the hub flange 23 through the torsion springs 24. Subsequently, the power is further transmitted from the hub flange 23 to an electric motor, a power generator, a transmission and so forth disposed on an output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the friction coupling unit 10.

In the damper unit 20, when the power is transmitted to the torsion springs 24 from the clutch plate 21 and the retaining plate 22, the torsion springs 24 are compressed. Besides, the torsion springs 24 are repeatedly compressed and extended by torque fluctuations. When the torsion springs 24 are compressed and extended, torsion (displacement) is produced between the hub flange 23 and both the clutch plate 21 and the retaining plate 22. The hysteresis generating mechanism 25 is actuated by this torsion and generates a hysteresis torque. Accordingly, torque fluctuations are attenuated.

[Discharge of Water]

As shown in FIG. 6, steps are formed between the pair of friction members 17 and the core plate 16. In more detail, each friction member 17 has a predetermined thickness. Hence, the inner peripheral part of each friction member 17 axially protrudes by the thickness thereof compared to the core plate 16. Therefore, as shown in the cross section 6A of FIG. 6, spaces S are produced while the pair of friction members 17 is interposed and held between the damper cover 11 and the pressure ring 12. The spaces S are enclosed by the damper cover 11, the inner peripheral end surfaces 17b of the pair of friction members 17 and the pressure ring 12.

In such a condition, when the vehicle is kept stopped for a long period of time while water accumulates inside the torque limiter 1 due to immersion of the vehicle into the water, occurrence of condensation inside the vehicle or so forth, it is concerned that the water inside the torque limiter 1 drops down and accumulates atop the inner peripheral end surfaces 17b of the pair of friction members 17 in the clutch disc 13 (i.e., the spaces S shown in the cross section 6A). Especially, in the present preferred embodiment, each friction member 17 is not provided with any groove on the faces thereof. Hence, the water cannot be discharged through the faces of each friction member 17.

However, in the present preferred embodiment, each friction member 17 is provided with the discharge grooves 17a on the inner peripheral end surface 17b thereof. Hence, water is led to the slits 16d of the core plate 16 through the discharge grooves 17a when dropping on the inner peripheral end surface 17b of a part located in a low position in each friction member 17. Because of this, water can be prevented from accumulating on the inner peripheral end surface 17b of each friction member 17.

Other Preferred Embodiments

The present invention is not limited to the preferred embodiment described above, and a variety of changes or modifications can be made without departing from the scope of the present invention.

Figure 8:
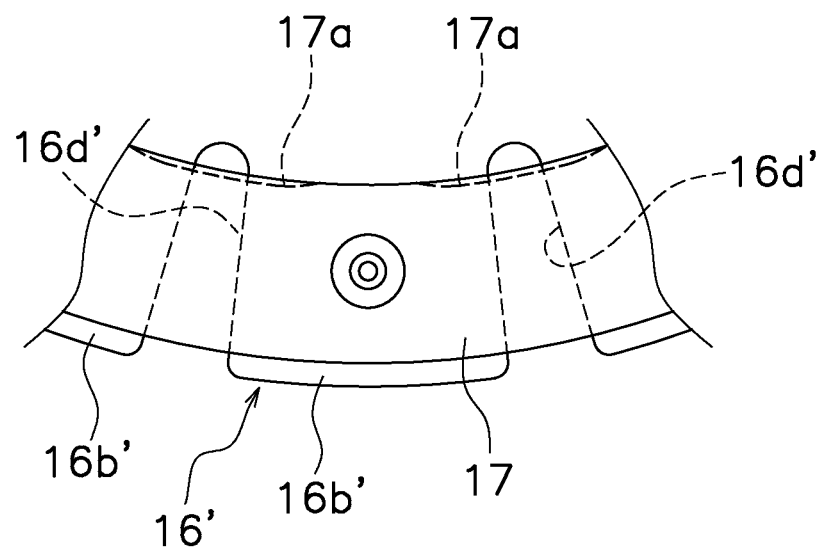
FIG. 8 is a diagram showing another preferred embodiment of a slit of a core plate.

(a) The shape of the slits provided in the core plate is not limited to that described in the aforementioned preferred embodiment. For example, FIG. 8 shows a core plate 16' provided with slits 16d', each of which is provided between adjacent two of fixation portions 16b' and is shaped to gradually increase in width to the outer peripheral side. In this case, each slit 16d' is gradually widened to the outer peripheral side, whereby water is more easily discharged therethrough.

(b) In the aforementioned preferred embodiment, the slits of the core plate are opened on the outer peripheral side. However, the slits can be closed on the outer peripheral side as long as the radially outer end of each slit is located on the outer peripheral side of the outer contour of each friction member 17. Besides, when the slits are opened on the outer peripheral side, the core plate can have a smaller outer diameter (at the radially outer end of each slit) than each friction member 17.

(c) In the present preferred embodiment, the discharge grooves 17a are provided on the core plate 16-side (the side closer to the core plate 16) on the inner peripheral end surface of each friction member 17. However, the axial position of the discharge grooves is not limited to this.

(d) In the aforementioned preferred embodiment, the present invention has been applied to the torque limiter 1 provided with not only the friction coupling unit 10 but also the damper unit 20. However, the present invention is similarly applicable to a torque limiter without provided with the damper unit 20.

REFERENCE SIGNS LIST

1 Torque limiter
11 Damper cover (input rotary member)
12 Pressure ring (pressure plate)
13 Clutch disc
14 Cone spring (pressing member)
16, 16' Core plate
16a Coupling portion
16b, 16b' Fixation portion
16c Attachment portion
16d, 16d' Slit
17 Friction member
17a Discharge groove
17b Inner peripheral end surface of friction member
21 Clutch plate (output rotary member)

What is claimed is:

1. A clutch disc comprising:
a core plate including a coupling portion having an annular shape and a plurality of fixation portions, the plurality of fixation portions provided to protrude radially outward from the coupling portion, the plurality of fixation portions circumferentially aligned through a plurality of slits each provided to radially extend between adjacent two of the plurality of fixation portions; and
a friction member having an annular shape, the friction member fixed to the plurality of fixation portions of the core plate, the friction member having an inner diameter larger than a diameter of the core plate at radially inner ends of the plurality of slits, wherein
the friction member is provided with a plurality of discharge grooves on an inner peripheral end surface thereof in corresponding portions thereof to the plurality of fixation portions, each of the plurality of discharge grooves connecting to each of the plurality of slits, the plurality of discharge grooves configured to lead water to the plurality of slits when the water drops on the inner peripheral end surface of the friction member, and
the plurality of discharge grooves are provided on a side closer to the core plate on the inner peripheral end surface of the friction member.

2. The clutch disc according to claim 1, wherein
the plurality of discharge grooves slant in the corresponding portions to the plurality of fixation portions in the friction member such that the water flows from a circumferential middle of each of the corresponding portions to slits provided on both circumferential sides of the each of the corresponding portions among the plurality of slits.

3. The clutch disc according to claim 2, wherein each of the plurality of discharge grooves is shaped to increase in depth as separated from the circumferential middle toward the both circumferential sides.

4. The clutch disc according to claim 1, wherein the plurality of slits of the core plate are opened on an outer peripheral side.

5. The clutch disc according to claim 1, wherein the core plate has a larger diameter at radially outer ends of the plurality of slits than an outer diameter of the friction member.

6. The clutch disc according to claim 1, wherein the friction member has a friction surface which radially extends, the friction surface being flat without a groove thereon.

7. The clutch disc according to claim 1, wherein each of the plurality of slits of the core plate is shaped to increase in width toward an outer peripheral side.

8. A torque limiter comprising:
an input rotary member including a friction surface;
a pressure plate opposed to the friction surface of the input rotary member;
a pressing member configured to press the pressure plate toward the input rotary member;
the clutch disc recited in claim 1, the clutch disc interposed and held between the friction surface of the input rotary member and the pressure plate by the pressing member; and
an output rotary member provided with the clutch disc attached to an outer peripheral part thereof.

\* \* \* \* \*